Feb. 3. 1925.
W. H. MORGAN
METAL WHEEL
Filed May 13, 1922
1,524,745
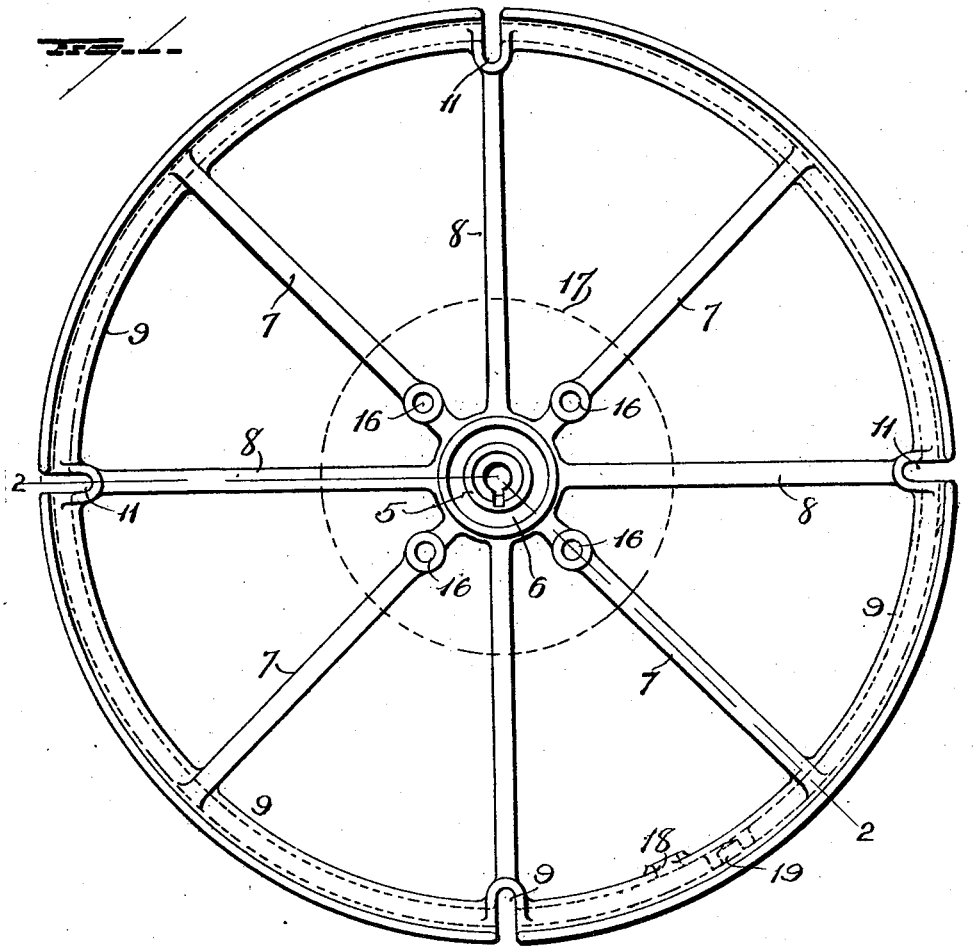

Patented Feb. 3, 1925.

1,524,745

UNITED STATES PATENT OFFICE.

WILLIAM HENRY MORGAN, OF ALLIANCE, OHIO.

METAL WHEEL.

Application filed May 13, 1922. Serial No. 560,637.

*To all whom it may concern:*

Be it known that I, WILLIAM H. MORGAN, a citizen of the United States, and a resident of Alliance, in the county of Stark and State of Ohio, have invented certain new and useful Improvements in Metal Wheels; and I do hereby declare the following to be a full, clear, and exact description of the invention, such as will enable others skilled in the art to which it appertains to make and use the same.

My invention relates to metal wheels for vehicles, particularly self propelled vehicles employing demountable rims and tires, and it consists in providing the felly of a one piece cast metal wheel, with a plurality of open slots through which the tire rim holding bolts pass, the advantages of such construction being that it obviates the drilling of holes through the wheel felly and facilitates casting, as the open slots compensate for or allow of contraction and expansion of the felly; prevent shrinkage cracks on the part of the wheel, and adds greatly to the resiliency of the wheel.

It further consists in other details of construction as will be more fully explained and pointed out in the claims.

In the accompanying drawings, Figure 1 is a view in elevation of a cast metal wheel embodying my invention and Figure 2 is a sectional view on the line 2—2 of Figure 1, and showing the rim and its holding means in place.

5 represents the hub of a cast metal wheel provided with a tapering bore, the rear wheels which I show in the drawing, being adapted to be keyed to the axle in the usual and well known manner. These hubs are designed to fit the axle of any standard make of car so that no changes whatsoever are necessary in applying my improved wheels thereto. The front wheels would of course be free to turn on their stub axles, and the brake band shown in Figure 1 would be omitted.

The outer end of the hub is threaded externally for the attachment of the hub cap (not shown) which forms a housing for the nut which secures the hub to the axle, and the inner end of the hub is enlarged as shown and preferably provided with a cord circular recess 6 which is concentric with the axle opening in the hub, and is open at the inner end of the hub.

Cast integral with the hub 5 are the staggered spokes 7 and 8, the spokes 7 being cast integral with the hub adjacent the inner end of the latter and the intermediate spokes 8 being cast integral with the hub, nearer the outer end as clearly shown in Figure 2. The spokes 7 are inclined, slightly outwardly from the hub to the felly and the outer alternate spokes 8 are inclined inwardly from the hub to the felly and terminate at their outer ends in the same plane with the spokes 7

The felly 9 is cast integral with the spokes, and is shaped in cross section, as shown in Figure 2, to receive the rim 10, the inner edge of the felly being inclined outwardly and inwardly to form a stop and seat for the rim.

The felly is provided at intervals with the open slots 11 designed to receive the bolts 12 which lock the rim to the felly. In the drawing I have shown four slots located ninety degrees apart, but I may use a greater or lesser number. I have also shown them located at the ends of alternate spokes, but it is clearly evident that they could be formed intermediate the spokes.

The slots 11 are sufficiently deep so that the bolts may be introduced under the rim without contacting with the latter as shown in Figure 2, and carry the clips 13 which project beyond the felly and overlap the inner edge of the rim 10 for locking the same in place in the usual manner, the clips being provided with the inwardly extending ends 14 which bear against the reinforcing ribs 15 at the outer margin of each slot 11 for preventing the clip from turning in the event the nuts 13 on the bolts 12 should become loose. The inner series of spokes 7 are provided with enlargements 16 cored or bored to receive bolts which secure the brake drum 17 in position.

The front wheels would be identical with the wheel above described except that they would not be keyed to the axles, and the enlargements 16 for the brake drum securing bolts omitted.

From the foregoing it will be seen that by removing the clips 13 or loosening up the nuts so as to permit the clip to be turned out of the way of the rim, the latter can be applied to the felly and then secured by adjusting the clips and securing the latter by screwing up the nuts on the bolts 12.

The wheels may be designed for use with any make of automobile without any change whatsoever in the latter and is also designed to receive standard demountable rims without changing the latter.

The felly is provided with a cored or bored opening 18 for the air valve stem from the inner tube of the tire and if desired may be provided with a recess or seat 19 to receive a projection usually formed on the rim for preventing the latter from turning on the felly.

By providing the felly with open slots for the rim securing bolts, it is obvious that the slots facilitate casting, as they allow for contraction and expansion of the felly and prevent the latter from breaking or cracking. Said slots add resiliency to the wheel; and obviate the drilling of holes through the rim for the rim holding bolts and thus reduce the cost of manufacture. The staggered arrangement of the spokes on the hub add strength to the wheel.

Again the bolt exerts a pressure on the flange of the wheel at the open ends of the slots inwardly or toward the hub, which tends to pull the upper or outer corners of the slot together and put a strain on the wheel in the direction of the circumference of the rim. The advantage of this is that it tends to keep the flange of the wheel perfectly circular and counteract any deflection that might be in the rim due to the load on the wheel or from any other cause.

It is evident that many slight changes might be resorted to in the relative arrangement of parts shown and described without departing from the spirit and scope of my invention, hence I would have it understood that I do not wish to confine myself to the exact construction and arrangement of parts shown and described but, Having fully described my invention what I claim as new and desire to secure by Letters Patent, is:—

1. As a new article of manufacture, a metal wheel comprising a hub, spokes and felly all cast integral, the felly having a plurality of open slots extending throughout the entire width of its periphery to receive rim securing bolts.

2. As a new article of manufacture, a metal wheel comprising a hub, spokes and felly all cast integral, the felly having a plurality of open slots extending the width of its periphery and each slot being reinforced by an integral flange at each open end of said slot.

3. As a new article of manufacture, a hub having staggered spokes all terminating in the same plane at their outer ends, and a felly at the outer ends of said spokes, all of said parts being cast integral and the felly provided with a plurality of open slots extending throughout the entire width of its periphery to receive the rim securing bolts, the said slots being located in the planes of the spokes.

4. As a new article of manufacture, a metal wheel comprising a hub, spokes and felly all cast integral the felly having a series of open slots extending throughout the width of the latter and located in the plane of spokes of the wheel.

5. As a new article of manufacture, a metal wheel comprising an integral hub, spokes and felly the latter having a plurality of open slots in its periphery, the said slots extending throughout the width of the felly.

In testimony whereof I have signed this specification in the presence of two subscribing witnesses.

WILLIAM HENRY MORGAN.

Witnesses:
C. E. BERTOLETTE,
N. C. FETTERS.